(12) United States Patent
Slobodecki et al.

(10) Patent No.: US 7,419,206 B2
(45) Date of Patent: Sep. 2, 2008

(54) INTERIOR TRIM FASTENER SYSTEM

(75) Inventors: Jeffrey A. Slobodecki, Wales, MI (US); Steven M. Benedetti, Sterling Heights, MI (US); Charles K. Fischer, Grant Township, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/496,008

(22) Filed: Jul. 28, 2006

(65) Prior Publication Data

US 2008/0030042 A1 Feb. 7, 2008

(51) Int. Cl.
*B60J 3/00* (2006.01)

(52) U.S. Cl. .................. 296/97.9; 362/492; 24/289; 24/295; 24/297

(58) Field of Classification Search ............... 296/1.08, 296/97.9, 146.7, 214; 248/289.11; 362/492; 24/289, 293, 295, 297, 453
See application file for complete search history.

(56) References Cited

U.S. PATENT DOCUMENTS

| | | | | |
|---|---|---|---|---|
| 2,199,347 A | * | 4/1940 | Roethel | 24/293 |
| 2,598,776 A | * | 6/1952 | Flora | 24/295 |
| 3,310,929 A | * | 3/1967 | Garvey | 24/295 |
| 4,893,866 A | | 1/1990 | Dowd et al. | |
| 4,902,068 A | | 2/1990 | Dowd et al. | |
| 4,913,484 A | | 4/1990 | Dowd et al. | |
| 4,981,322 A | | 1/1991 | Dowd et al. | |
| 4,981,323 A | | 1/1991 | Dowd et al. | |
| 4,989,911 A | | 2/1991 | Van Order | |
| 5,031,953 A | | 7/1991 | Miller | |
| 5,031,954 A | | 7/1991 | Peterson et al. | |
| 5,056,853 A | | 10/1991 | Van Order | |
| 5,061,005 A | | 10/1991 | Van Order et al. | |
| 5,082,322 A | | 1/1992 | Cekander et al. | |
| 5,082,323 A | | 1/1992 | Dowd et al. | |
| 5,186,517 A | | 2/1993 | Gilmore et al. | |
| 5,195,793 A | * | 3/1993 | Maki | 293/155 |
| 5,201,564 A | | 4/1993 | Price | |
| 5,236,240 A | | 8/1993 | Burns et al. | |

(Continued)

FOREIGN PATENT DOCUMENTS

DE 1 157 434 11/1963

(Continued)

OTHER PUBLICATIONS

Drawings of sunvisor fastener from third party (Feb. 2006), 2 pages.

(Continued)

*Primary Examiner*—D. Glenn Dayoan
*Assistant Examiner*—Paul A Chenevert
(74) *Attorney, Agent, or Firm*—Harness, Dickey & Pierce, P.L.C.

(57) ABSTRACT

A quick connect fastener system is provided. In another aspect of the present invention, a snap-in fastener is used for retaining an automotive vehicle interior trim member. A further aspect of the present invention employs a base and a resilient retainer, one of which includes a metallic portion and the other of which includes a polymeric portion. Moreover, a generally rigid polymeric base employs a channel operably receiving a metallic retainer in a laterally sliding manner to ease in assembly of the retainer to the base in an adhesive and screw-free manner.

27 Claims, 12 Drawing Sheets

U.S. PATENT DOCUMENTS

| | | | | |
|---|---|---|---|---|
| 5,288,530 | A * | 2/1994 | Maki | 428/31 |
| 5,314,227 | A * | 5/1994 | Weiland et al. | 296/97.9 |
| 5,499,854 | A | 3/1996 | Crotty, III et al. | |
| 5,752,853 | A | 5/1998 | Curtindale | |
| 5,765,898 | A * | 6/1998 | Crotty, III | 296/97.9 |
| 5,829,817 | A | 11/1998 | Ge | |
| 5,857,735 | A * | 1/1999 | Alonso Cuesta | 296/214 |
| 5,876,084 | A * | 3/1999 | Smith et al. | 296/39.1 |
| 5,967,589 | A * | 10/1999 | Spadafora | 296/97.9 |
| 6,003,928 | A | 12/1999 | Curtindale | |
| 6,015,126 | A | 1/2000 | Murdock | |
| 6,021,986 | A * | 2/2000 | Murdock | 248/289.11 |
| 6,049,952 | A | 4/2000 | Mihelich et al. | |
| 6,113,253 | A * | 9/2000 | Yoshii et al. | 362/492 |
| 6,141,837 | A * | 11/2000 | Wisniewski | 24/295 |
| 6,176,660 | B1 | 1/2001 | Lewis et al. | |
| 6,179,366 | B1 * | 1/2001 | Hansz | 296/97.9 |
| 6,250,708 | B1 * | 6/2001 | Kurachi | 296/97.9 |
| 6,270,240 | B1 * | 8/2001 | Inoue | 362/492 |
| 6,381,811 | B2 | 5/2002 | Smith et al. | 24/289 |
| 6,398,295 | B2 * | 6/2002 | Asai | 296/214 |
| 6,511,116 | B2 * | 1/2003 | De Jongh et al. | 296/97.9 |
| 6,517,039 | B1 * | 2/2003 | Arisaka | 248/231.81 |
| 6,568,749 | B2 * | 5/2003 | Sawayanagi et al. | 296/214 |
| 6,644,713 | B2 * | 11/2003 | Del Pozo Abejon et al. | 296/39.1 |
| 6,659,527 | B1 * | 12/2003 | Wilson | 296/97.11 |
| 6,715,185 | B2 * | 4/2004 | Angellotti | 24/297 |
| 6,722,730 | B2 * | 4/2004 | Lydan et al. | 296/191 |
| 6,817,583 | B2 | 11/2004 | Wilson | |
| 6,857,168 | B2 | 2/2005 | Lubera et al. | |
| 6,886,969 | B2 * | 5/2005 | Nagata | 362/488 |
| 6,896,311 | B2 | 5/2005 | Schultz et al. | |
| 6,945,588 | B2 | 9/2005 | Schultz et al. | |
| 6,976,292 | B2 | 12/2005 | MacPherson et al. | |
| 7,036,877 | B2 | 5/2006 | Schultz et al. | |
| 7,165,371 | B2 * | 1/2007 | Yoyasu | 52/716.5 |
| 2002/0194710 | A1 | 12/2002 | Dickinson et al. | |
| 2003/0024077 | A1 | 2/2003 | Vassiliou | |
| 2003/0024078 | A1 | 2/2003 | Vassiliou | |
| 2004/0004368 | A1 * | 1/2004 | Davey et al. | 296/97.9 |
| 2004/0124650 | A1 | 7/2004 | Del Pozo Abejon | |
| 2004/0139584 | A1 | 7/2004 | Gibbons et al. | |
| 2006/0012222 | A1 | 1/2006 | Schultz et al. | |

FOREIGN PATENT DOCUMENTS

| | | |
|---|---|---|
| DE | 26 48 467 A1 | 4/1978 |
| EP | 0 930 440 B1 | 4/2003 |
| FR | 1.477.535 | 3/1967 |
| GB | 1 229 668 | 4/1971 |

OTHER PUBLICATIONS

Drawing of Four Slide Inc. Sunvisor Clip for 2005 M.Y. KJ vehicle (believed to have been offered for sale prior to 2006).

Drawings of sunvisor fastener from third party (Mar. 2006), 4 pages.

Photograph of metallic sunvisor fastener having adhesively bonded soft gasket and adhesively bonded Mylar sheet (believed to have been offered for sale or publicly used prior to 2006), 2 pages.

* cited by examiner

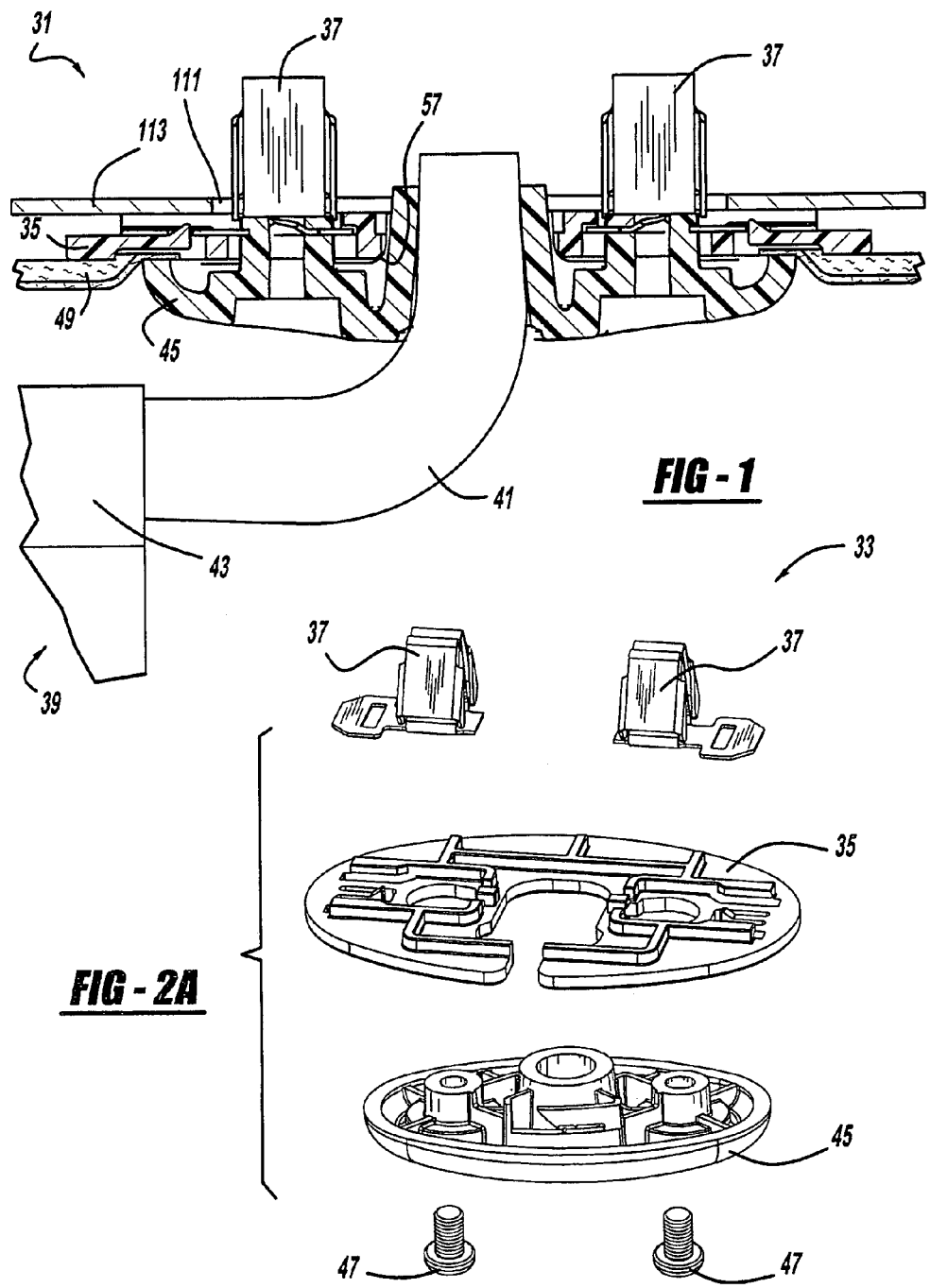

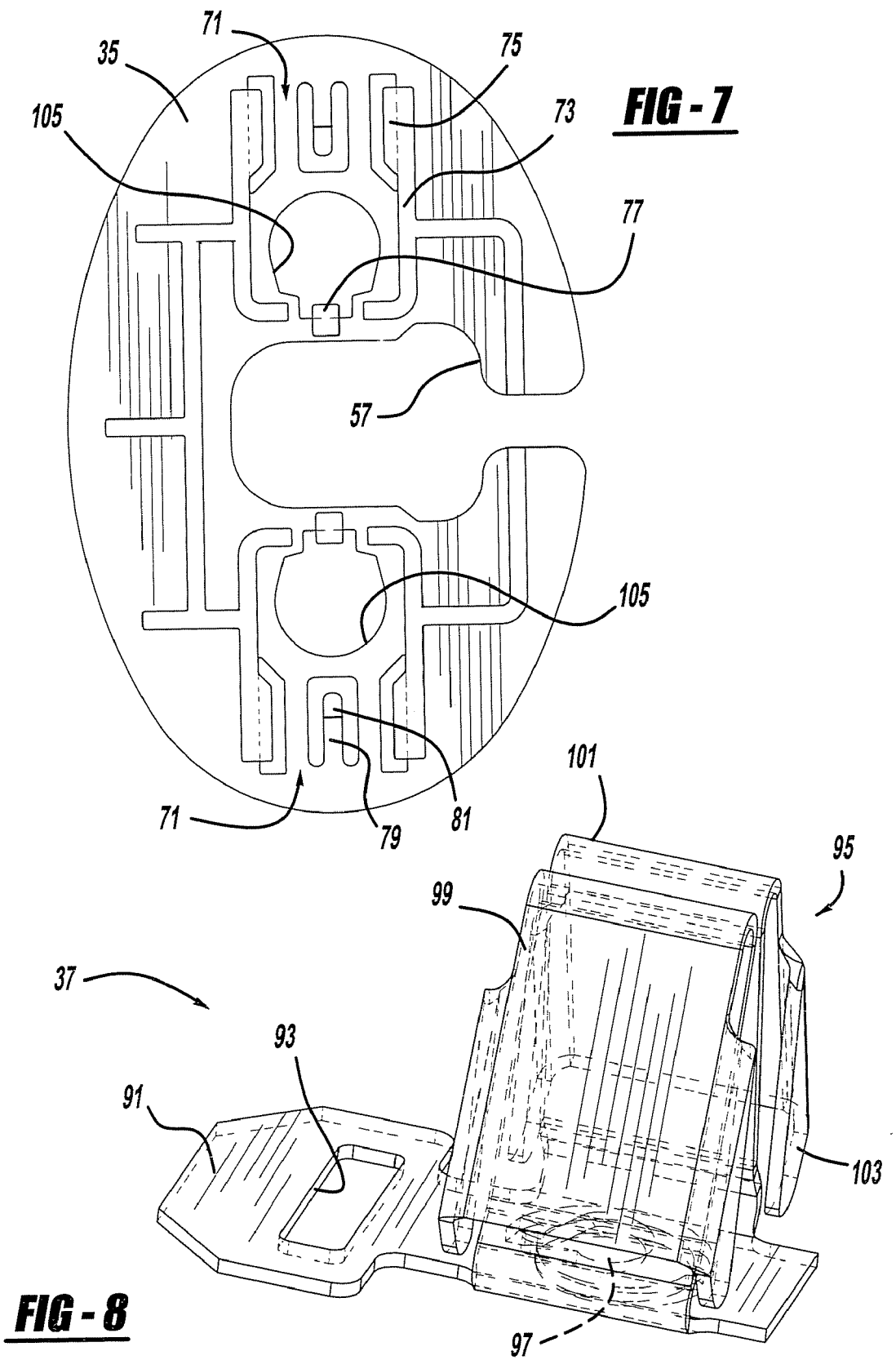

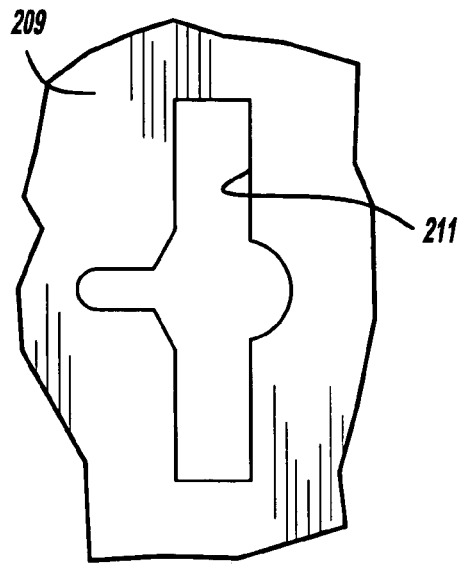
FIG - 20
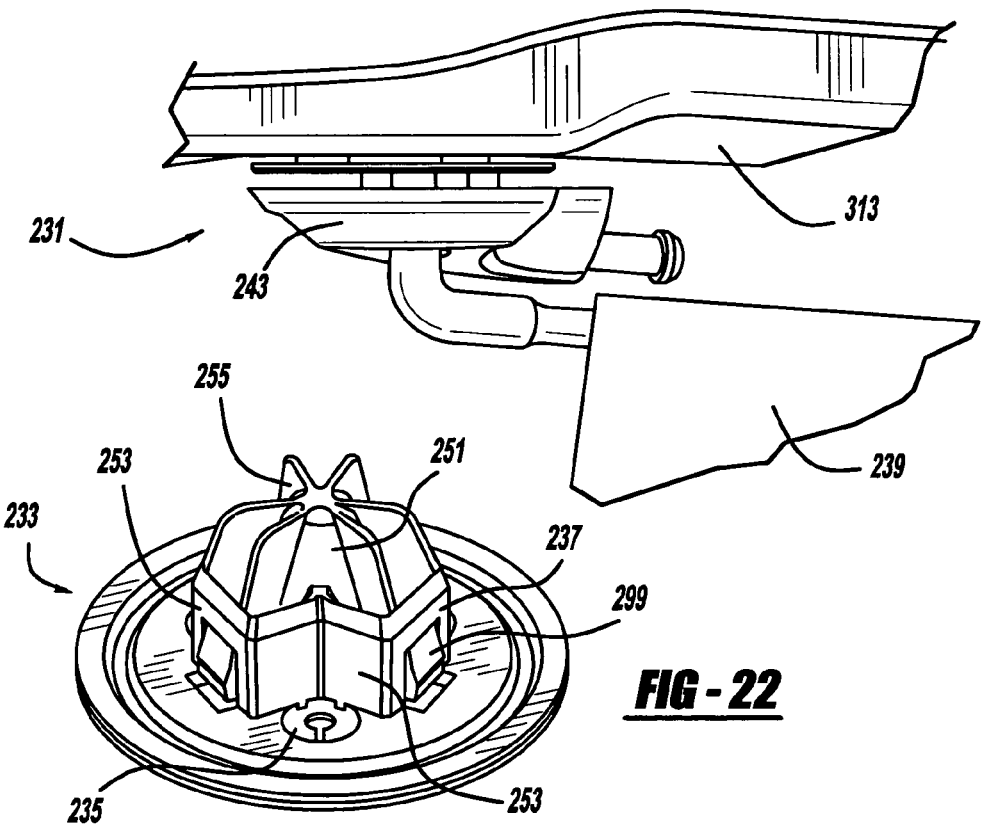
FIG - 21
FIG - 22

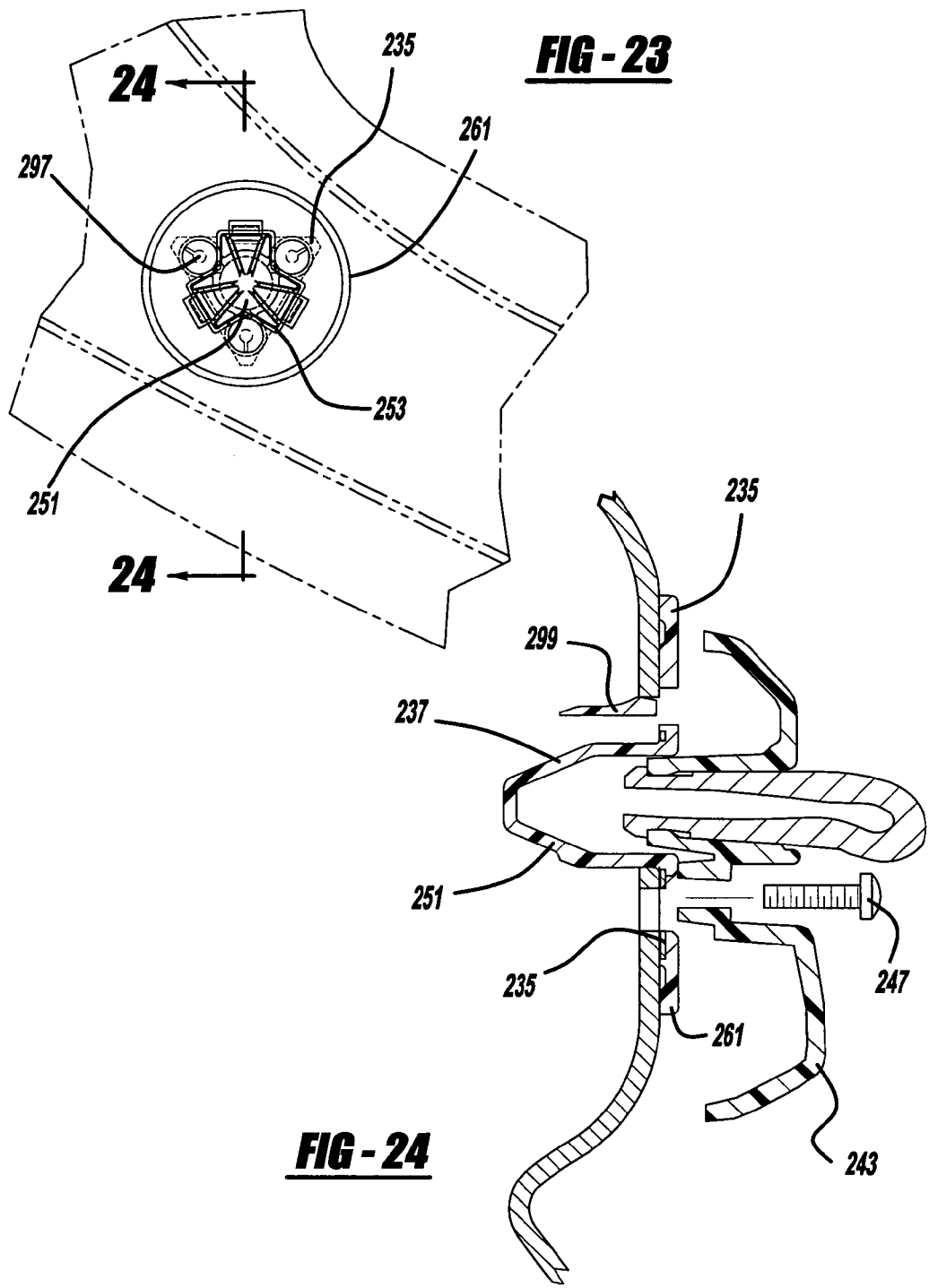

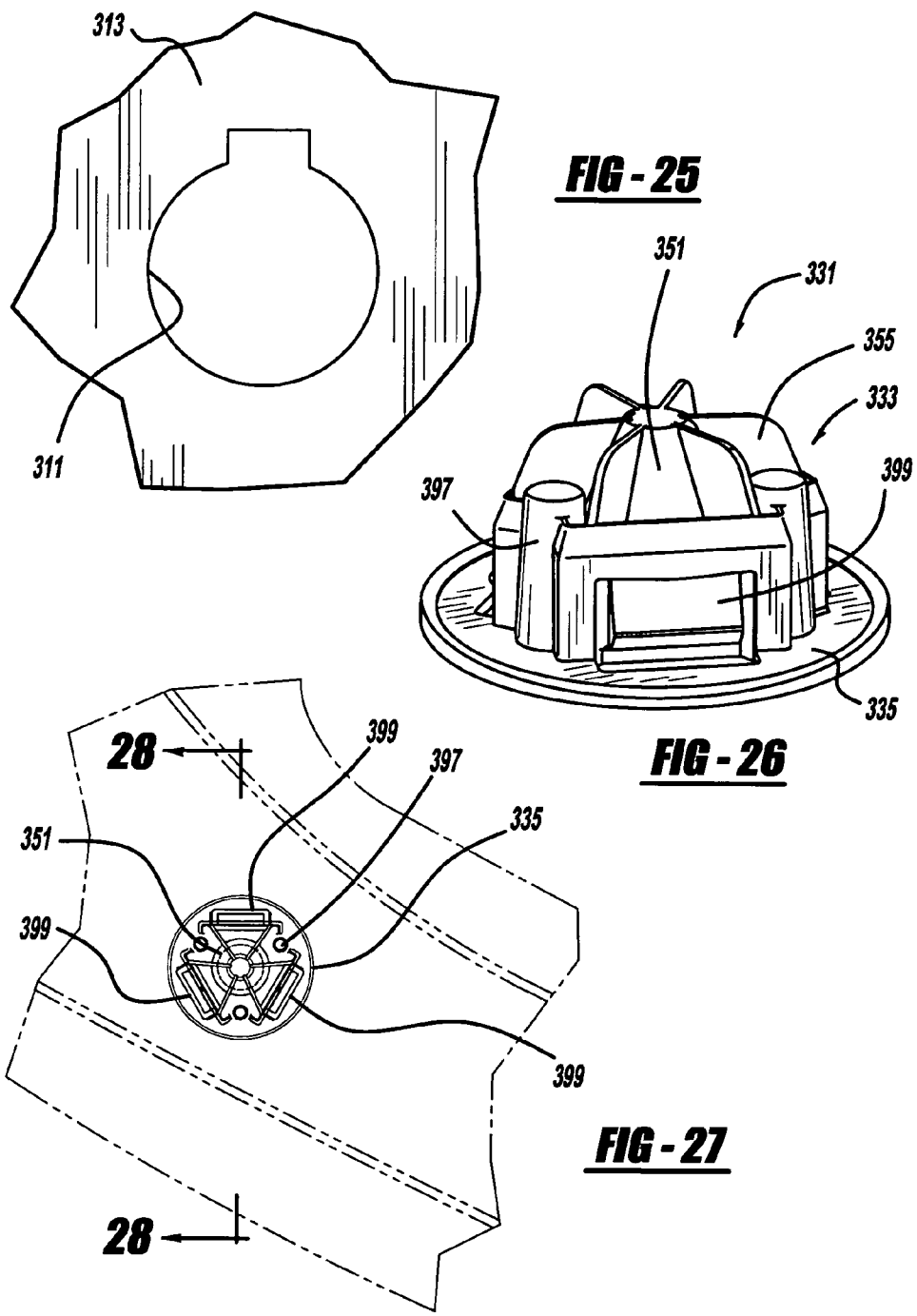

INTERIOR TRIM FASTENER SYSTEM

BACKGROUND

The present invention generally pertains to a fastener and more particularly to an interior trim fastener for an automotive vehicle.

Modular headliners and snap-in visor mounts are well known in the automotive industry. Such conventional constructions are disclosed in U.S. Pat. No. 5,201,564 entitled "Snap-In Visor Mount" which issued to Price on Apr. 13, 1993, and U.S. Pat. No. 5,082,323 entitled "Sunshade Fastener Module for Use with Modular Headliner" which issued to Dowd et al. on Jan. 21, 1992, both of which are incorporated by reference herein. The vehicle insertion forces, fastener retention and strength forces, and the suitability of the fastener to account for vehicular body variations, however, is not satisfactorily achieved with conventional devices.

SUMMARY

In accordance with the present invention, a quick connect fastener system is provided. In another aspect of the present invention, a snap-in fastener is used for retaining an automotive vehicle interior trim member. A further aspect of the present invention employs a base and a resilient retainer, one of which includes a metallic portion and the other of which includes a polymeric portion. Moreover, a generally rigid polymeric base employs a channel operably receiving a metallic retainer in a laterally sliding manner to ease in assembly of the retainer to the base in an adhesive and screw-free manner.

The fastener system of the present invention is advantageous over traditional constructions in that the present invention satisfactorily allows for vehicular body panel hole size variances and body panel thickness variances without degrading insertion and retention forces of the fastener. Furthermore, the present invention advantageously achieves retention-to-insertion force ratio of at least 10:1 which allows for easy installation by the workers on a moving assembly line without tools while also providing a very strong connection. The present invention is additionally advantageous by allowing for a quick and simplified assembly of the metallic retainer to the polymeric base, in a removable fashion. Moreover, the rigidity and lateral size of the base of the present invention achieve a large and generally uniform surface area compression against the adjacent interior trim member, especially as compared to the undesirable point-loading of prior devices. Additional advantages and features of the present invention will become apparent from the following description and appended claims, taken in conjunction with the accompanying drawings.

BRIEF DESCRIPTION OF THE DRAWINGS

FIG. 1 is a partially fragmented rear elevational view showing the preferred embodiment of the fastener system of the present invention;

FIG. 2A is an exploded perspective view showing the preferred embodiment fastener system;

FIG. 7 is a top elevational view showing the base of the preferred embodiment fastener system;

FIG. 8 is a top and rear perspective view showing the retainer of the preferred embodiment fastener system;

FIG. 20 is a top elevational view showing a vehicular panel hole employed with the first alternate embodiment fastener system;

FIG. 21 is a rear perspective view showing a second alternate embodiment of the fastener system of the present invention;

FIG. 22 is a top and rear perspective view showing the second alternate embodiment fastener system;

FIG. 23 is a top elevational view showing the second alternate embodiment fastener system;

FIG. 24 is a cross-sectional view, taken along line 24-24 of FIG. 23, showing the second alternate embodiment fastener system;

FIG. 25 is a top elevational view showing a vehicular panel hole employed with the second alternate embodiment fastener system;

FIG. 26 is a top and rear perspective view showing a third alternate embodiment of the fastener system of the present invention;

FIG. 27 is a top elevational view showing the third alternate embodiment fastener system.

DETAILED DESCRIPTION OF THE PREFERRED EMBODIMENT

Figure 2B:
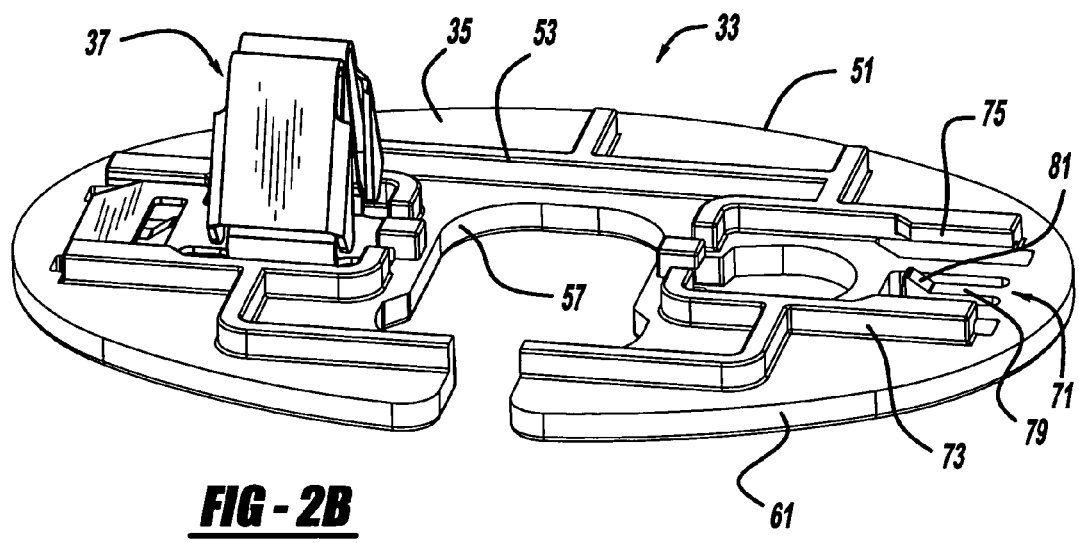
FIG. 2B is a rear and top perspective view showing the preferred embodiment fastener system with only one retainer assembled to a base.
Figure 3:
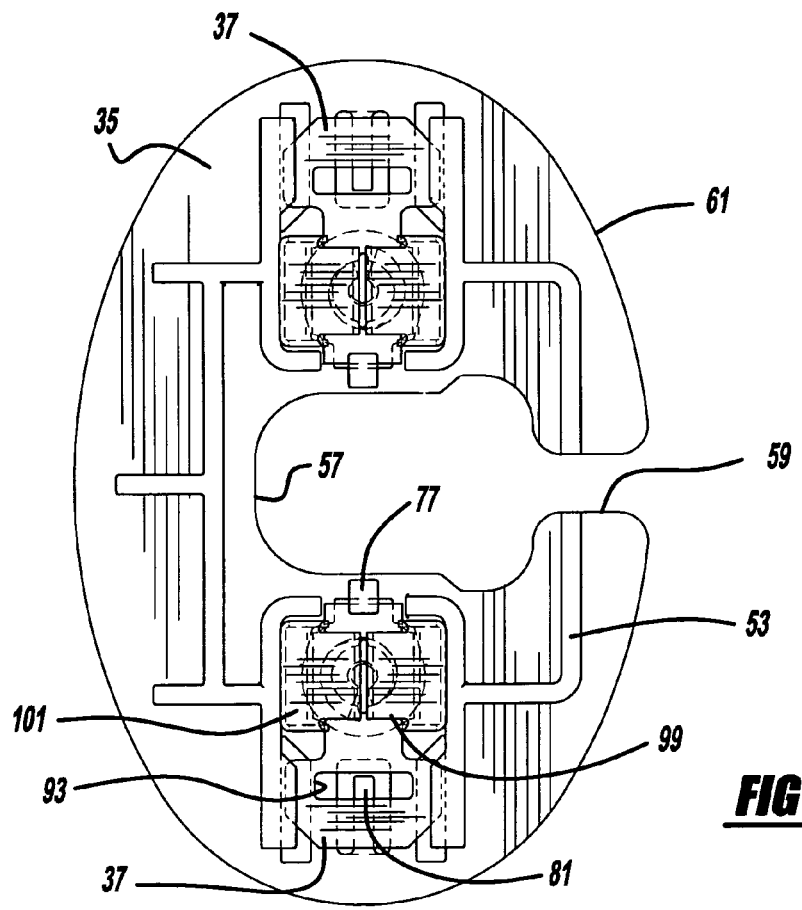
FIG. 3 is a top elevational view showing the preferred embodiment fastener system.
Figure 4:
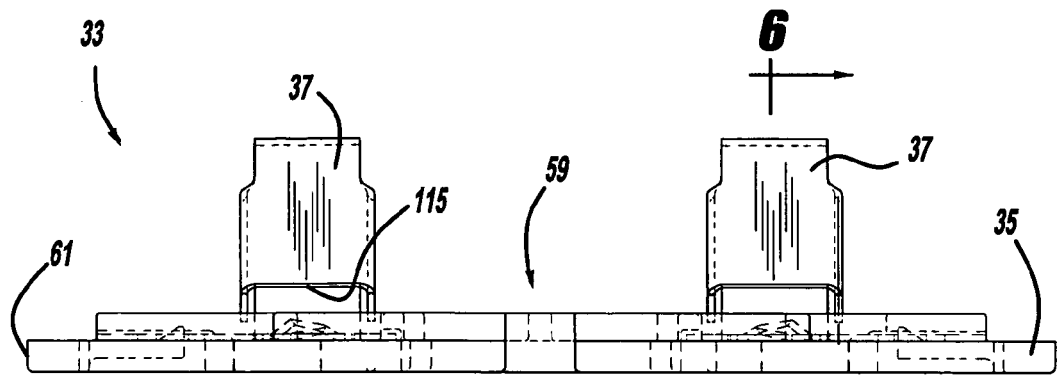
FIG. 4 is a rear elevational view showing the preferred embodiment fastener system.
Figure 5:
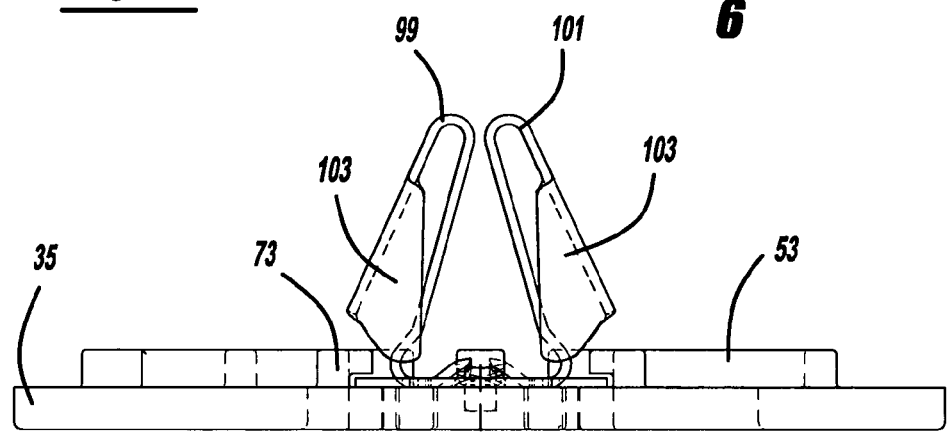
FIG. 5 is a side elevational view showing the preferred embodiment fastener system.
Figure 6:
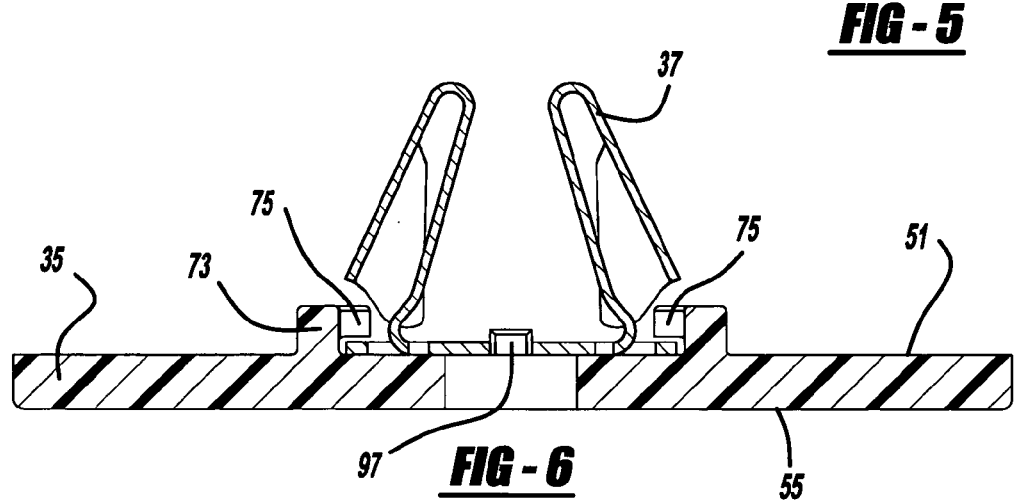
FIG. 6 is a cross-sectional view, taken along ling 6-6 of FIG. 4, showing the preferred embodiment fastener system.
Figure 9:
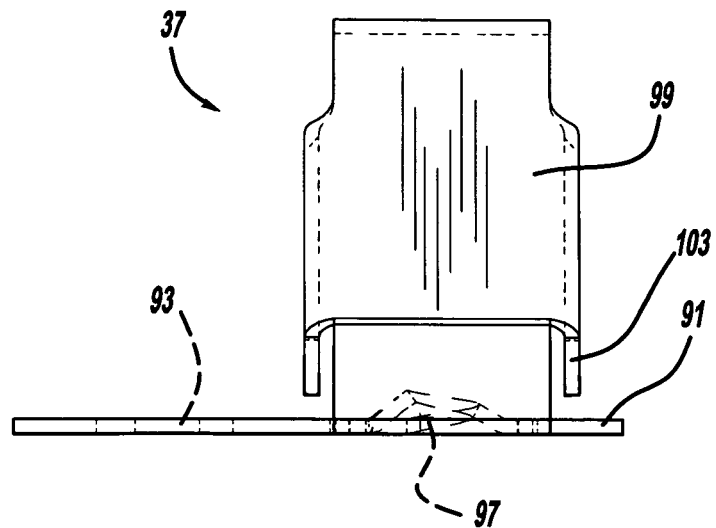
FIG. 9 is a rear elevational view showing the retainer of the preferred embodiment fastener system.
Figure 10:
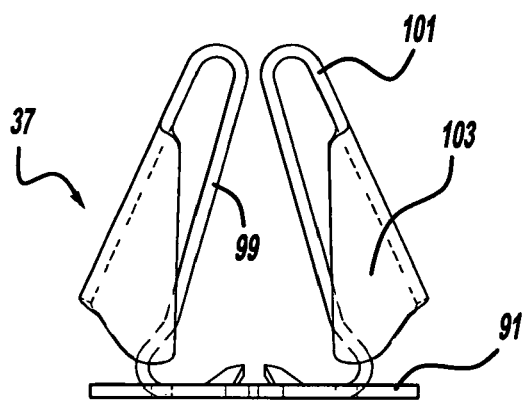
FIG. 10 is a side elevational view showing the retainer of the preferred embodiment fastener system.
Figure 11:
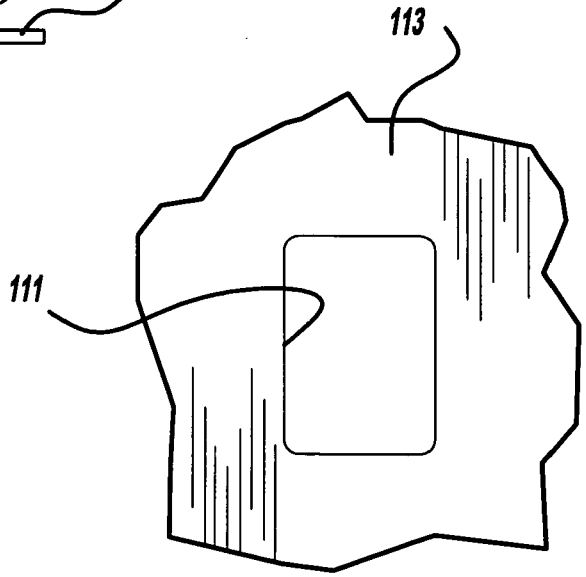
FIG. 11 is a top elevational view showing a vehicular panel hole employed with the preferred embodiment fastener system.
Figure 12:
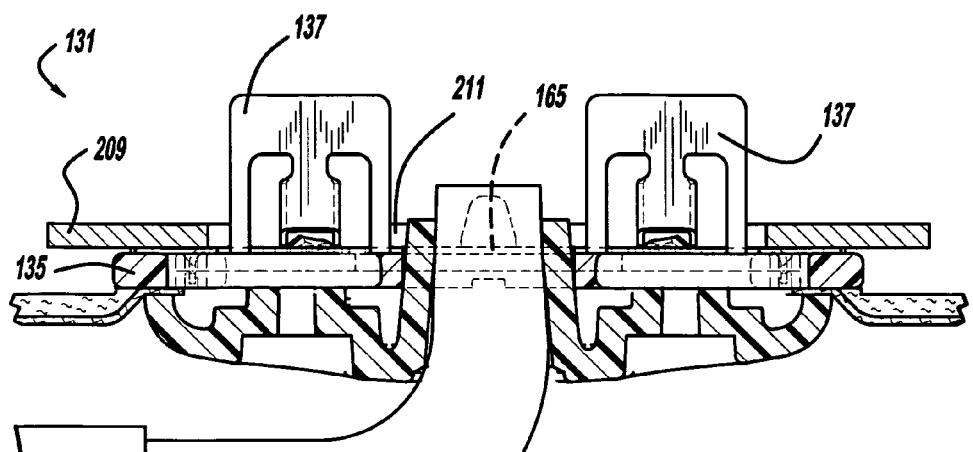
FIG. 12 is a partially fragmented rear elevational view showing a first alternate embodiment of the fastener system of the present invention.
Figure 13:
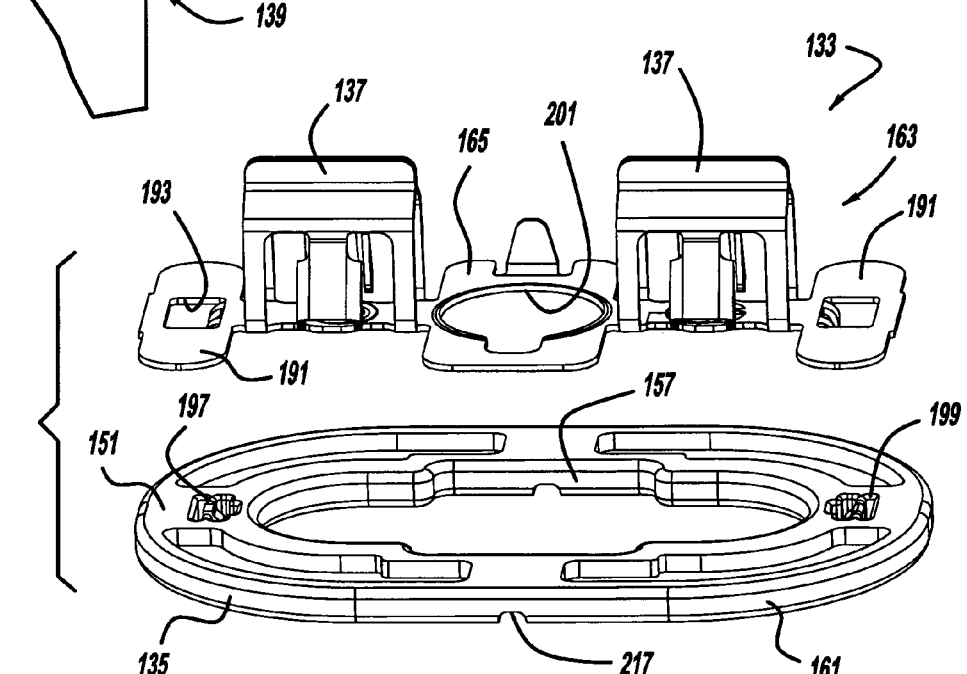
FIG. 13 is an exploded perspective view showing the first alternate embodiment fastener system.
Figure 14:
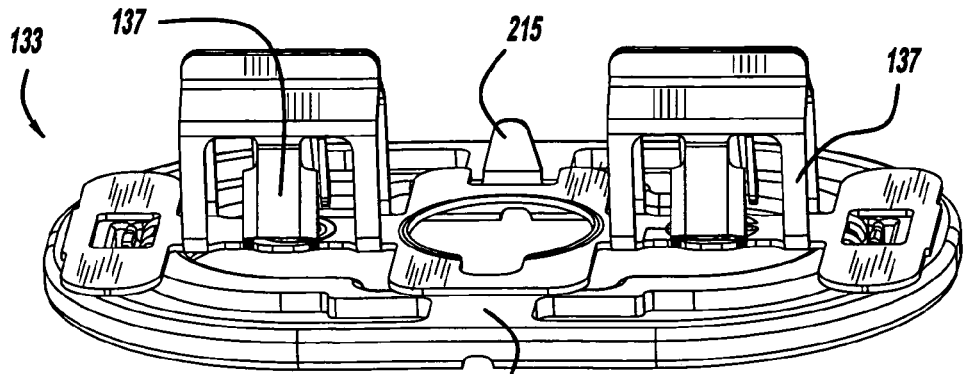
FIG. 14 is a top and rear perspective view showing the first alternate embodiment fastener system.
Figure 15:
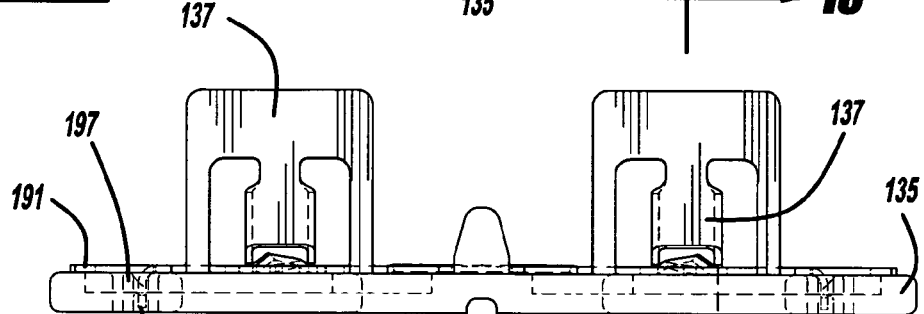
FIG. 15 is a rear elevational view showing the first alternate embodiment fastener system.
Figure 16:
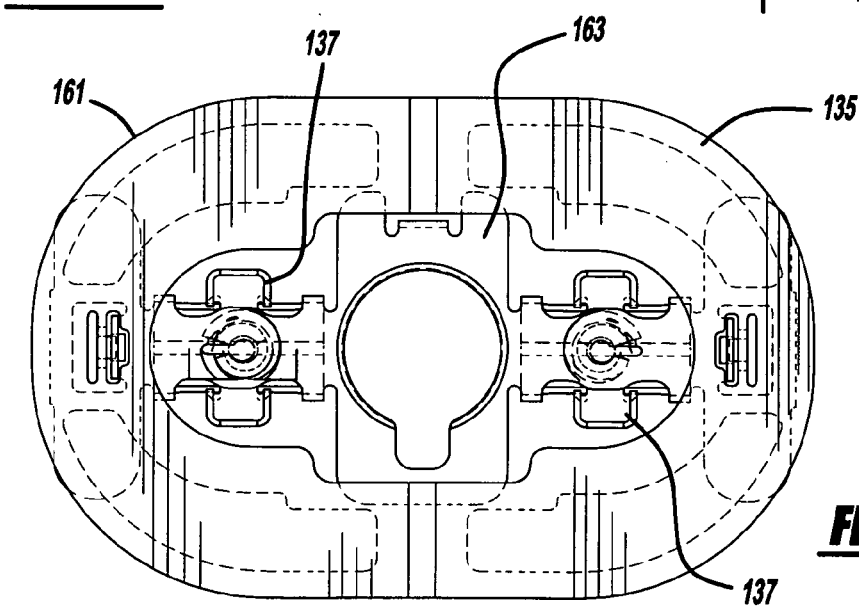
FIG. 16 is a bottom elevational view showing the first alternate embodiment fastener system.
Figure 17:
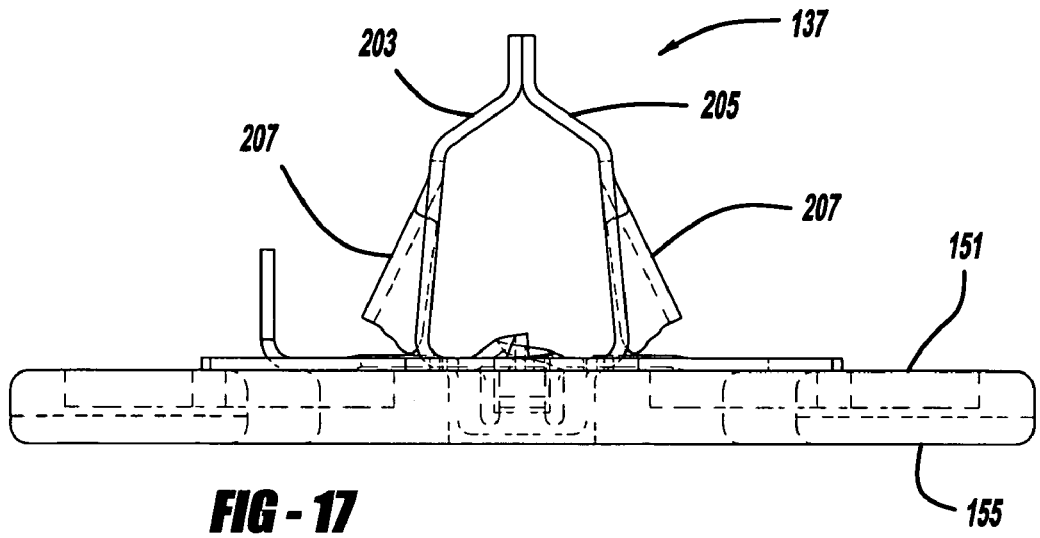
FIG. 17 is a side elevational view showing the first alternate embodiment fastener system.
Figure 18:
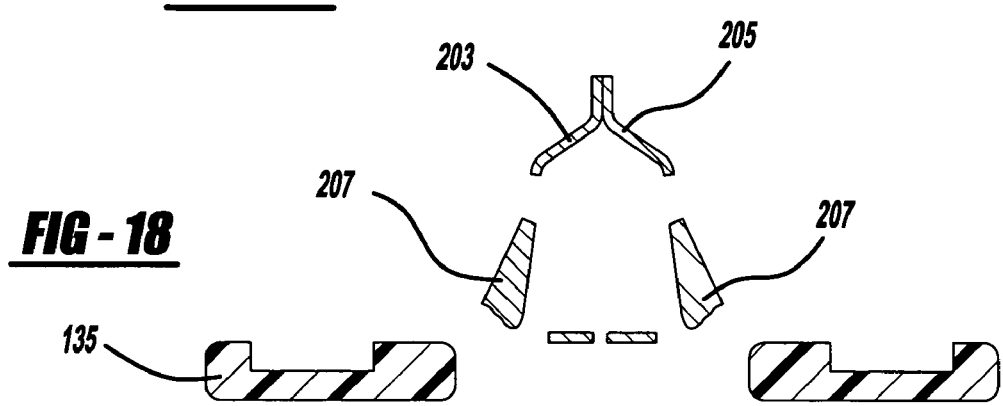
FIG. 18 is a cross-sectional view, taken along line 18-18 of FIG. 15, showing the first alternate embodiment fastener system.
Figure 19:
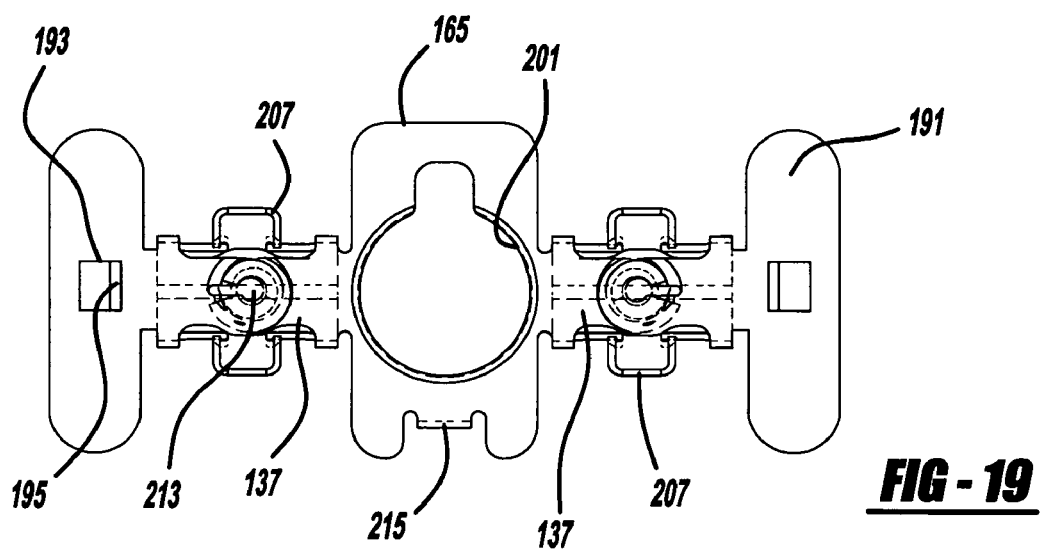
FIG. 19 is a top elevational view showing a retainer of the first alternate embodiment fastener system.

An interior trim fastener system 31 of the present invention is employed in an automotive vehicle as is shown FIGS. 1-11. A fastener 33 includes a laterally enlarged base 35 and two attached retainers 37. A sunvisor assembly 39 includes a metallic and tubular elbow 41, a cloth or vinyl covered plastic or foam sunvisor blade 43, and an appearance bezel 45 made from a polymeric material. A pair of threaded screws 47 removably secure bezel 45 to fastener 33. Sunvisor blade 43 operably rotates about elbow 41 and elbow 41 is rotatable relative to bezel 45. An interior trim member, such as a headliner 49, is sandwiched between bezel 45 and base 35 to allow for preassembly as a modular headliner prior to final vehicle installation of the module. Headliner 49 has an opening through which an end of elbow 41 and adjacent portion of bezel 45 project. Headliner 49 is preferably made from a cloth or vinyl covered substrate made from a resinated foam or fiberglass material. It is alternately envisioned that fastener 33 can secure interior trim members other than a headliner and sunvisor assembly to the automotive vehicle, although various advantages of the present invention may not be realized.

Base 35 is preferably injection molded from an acetal polymeric material and serves as a somewhat rigid spacer member. Base 35 has a vehicular body-facing surface 51 upon which are formed upstanding ribs 53. An opposite and interior-facing surface 55 of base 35 is generally flat and acts to compress against the backside of headliner 49 when installed thereby providing a somewhat uniform surface loading condition against the headliner in opposition to the bezel 45. A central aperture 57 is disposed within base 35 to receive elbow 41 and any associated electrical wires. A channel or opening 59 provides clear access between aperture 57 and a generally oval-shaped periphery 61 of base 35 to allow for passage of a sunvisor wire or the like. A retainer channel 71 or track is provided on each outboard and lateral side of base 35. Each channel 71 is defined by upstanding side walls 73 which have inwardly facing ledges 75 at upper ends thereof. A generally inverted, L-shaped finger 77 is similarly shaped and located at the end of channel 71. Furthermore, a downwardly flexible arm 79, with an upwardly angled finger 81, acts as a snap-fit and is located at the outboard end of each channel 71.

Each retainer 37 includes a laterally extending flange 91, with an opening 93 therein, and a retaining portion 95 upwardly and flexibly projecting therefrom. A hole 97 is disposed in a narrower portion of flange 91. A pair of generally U-shaped tabs 99 and 101 upwardly extend from the narrower portion of flange 91 in an inwardly angled manner away from flange 91. A side wing 103 is folded alongside each side of tab 99 and 101. Each retainer 37 is similar to that disclosed in U.S. Pat. No. 6,976,292 entitled "Resilient Clip Fastener" which issued to MacPherson et al. on Dec. 20, 2005, which is incorporated by reference herein. Each retainer 37 is preferably stamped from 0.61 spring steel S.A.E. 1050 metal with an austemper "C" 42-50 heat treatment, and with a PS4220, code 30 plus PS1207 (Trivalent) finish.

The flange of each retainer 37 is laterally slid in a linear manner into the corresponding channel 71 of base 35 until it reaches its home position against finger 77. At this position, finger 81 of snap-fit arm 79 engages and abuts against an opening 93 of flange 91 to lock it in position without the need for threaded fasteners or adhesive. Thereafter, screws 47 are inserted through bezel 45, through supplemental apertures 105 in base 35 and engage into holes 97 in retainers 37 such that threaded ends of screws 47 extend at least partially between tabs 99 and 101 of each retainer. After the preassembled modularization, the assembly line worker manually pushes against sunvisor assembly 39 thereby causing tabs 99 and 101 of retainers 37 to engage into a generally rectangular hole 111 of a vehicular body panel 113 in a snap-in and tool free manner. Bottom edges 115 of each tab and its associated wings abut against a backside edge of vehicular body panel 113 to create satisfactory retention of the fastener therein. Fastener 33 is expected to exhibit a relatively low insertion force of approximately 18-20 pounds (as compared to conventional fasteners that exhibit insertion forces of approximately 25-30 pounds), have a retention force of greater than 200 pounds and can satisfactorily perform with a body panel thickness variation of about 0.8-1.1 mm and a hole size variation of plus or minus 0.25 mm.

A first alternate embodiment fastener system 131 is shown in FIGS. 12-20. The sunvisor assembly 139, headliner and screws are substantially like that employed with the previously disclosed preferred embodiment. A fastener 133 is somewhat different, however. A polymeric, injection molded base 135 has a generally curved and oval-shaped periphery 161 with a central and enclosed aperture 157. Base 135 also has a generally flat vehicular body-facing surface 151 and a generally flat interior-facing surface 155, but is fairly rigid.

A spring steel member 163 includes a pair of resilient retaining members 137 connected together by an integrally formed metallic central segment 165 and bordered by integrally formed outboard flanges 191. Flanges 191 each have an opening 193 within which a bent tongue 195 downwardly extends. Each tongue 195 engages with a snap-fit barbed finger 197 in a hole 199 through each lateral section of base 135. Central segment 165 includes a central aperture 201 which is aligned with aperture 157 of base and a sunvisor elbow. Each retainer 137 includes a pair of inwardly diverging arms 203 and 205 which contact against each other on an opposite end from that of base 135. A resilient wing 207 laterally extends generally fore and aft from each corresponding arm 203 and 205 for engagement with a backside of vehicular body panel 209 adjacent a hole 211 therein. A screw-receiving hole 213 is disposed in the bottom of each retainer and a locating flap 215 upwardly projects from central segment 165 for alignment with a mating section of vehicular body hole 211. Furthermore, a wire receiving channel 217 is located in the base between central aperture 157 and periphery 161.

Referring now to FIGS. 21-25, an interior trim fastener system 231 of a second alternate embodiment of the present invention is shown. A sunvisor assembly 239, including a polymeric bezel 243, screws 247 and a headliner are employed much as with the previously disclosed preferred embodiment. A fastener 233, however, is constructed from a metallic spring steel base plate 235 which is insert molded partially within a polymeric retainer 237. Metallic base plate 235 has a generally triangular and flat shape within which is disposed three holes 297, with appended slots, for receiving screws 247.

Retainer 237 is injection molded from Nylon 6/6 with 33% glass filling and a heat stabilized, homopolymer material. Retainer 237 includes a hollow central body 251 with three box-like structures 253 radially extending in lateral orientations therefrom. Resilient polymeric tabs 299 laterally project from structures 253 and each has an angled barb which engages the backside of an opening 311 of a vehicular body panel 313 for a quick connect, snap-in attachment. A polymeric flange portion of base 235 laterally extends in an enlarged manner from body 251. The base and body are integrally formed in a one piece manner, with metallic base plate 235 permanently attached to a vehicular body-facing surface of base 235. Six tapered ribs 255, equidistantly spaced around body 251, act as a lead-in for fastener engagement to the automotive vehicle. A peripheral edge 261 of the base portion 235 has a generally curved and circular shape.

Figure 28:
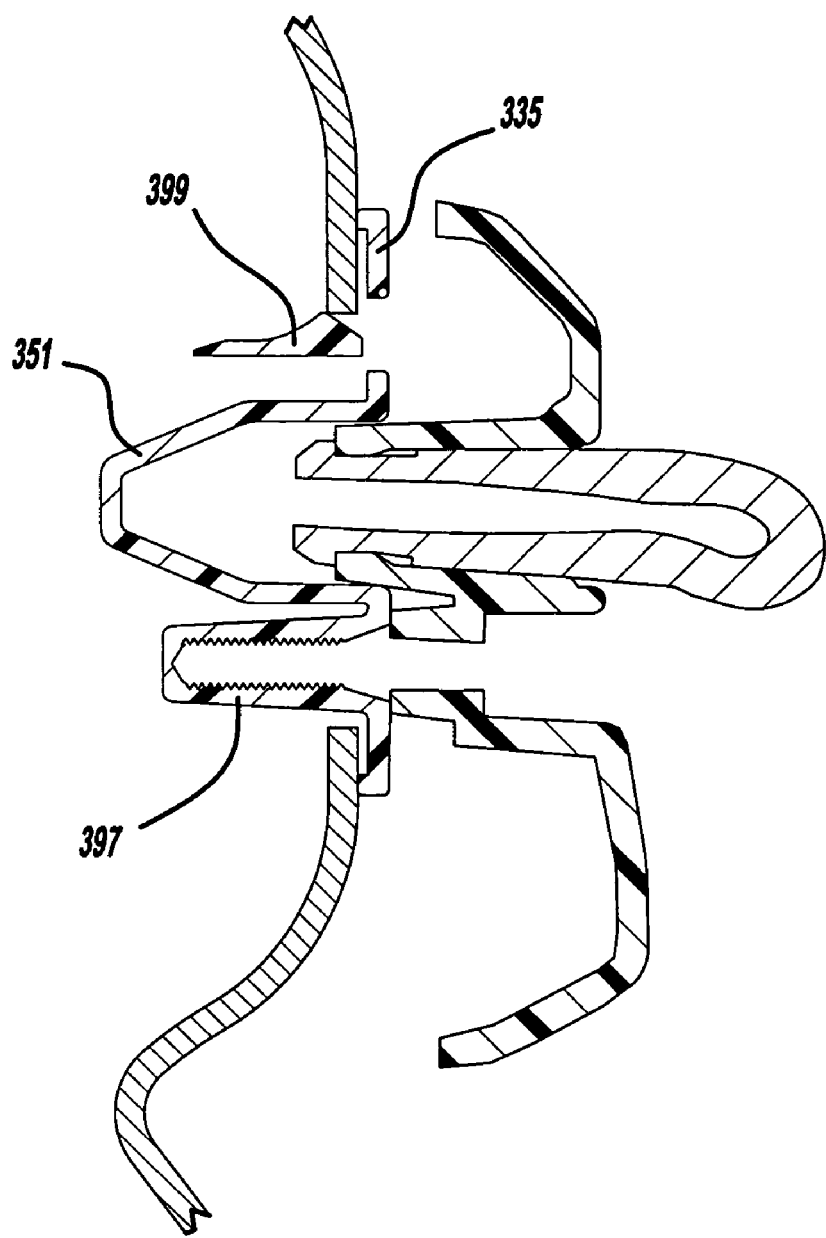
FIG. 28 is a cross-sectional view, taken along line 28-28 of FIG. 27, showing the third alternate embodiment fastener system.

Finally, a third alternate embodiment fastener system 331 of the present invention is illustrated in FIGS. 26-28. This fastener system is very similar to that of the second alternate embodiment disclosed hereinabove, however, a fastener 333 is entirely injection molded from a polymeric material. Fastener 333 has a central and hollow retainer body 351, resilient body panel-engagement tabs 399 and a laterally enlarged base 335. Screw-receiving threaded bosses 397 are positioned in an equidistant manner between the three tabs 399. Tapered lead-in ribs 355 also radially project from body 351 of the retainer.

While various aspects of the present invention have been disclosed, it should be appreciated that variations may be made within the scope of the present invention. For example, a greater number of body panel engagement tabs may be employed, more or less threaded fastener-receiving holes can be used, and alternate component shapes can be provided, although all of the advantages of the present invention may not be realized. While various materials, manufacturing processes and forces have been disclosed, it should be appreciated that other materials, processes and forces may be employed, although many of the presently disclosed advantages may not be realized. It is intended by the following claims to cover these and any other departures from the disclosed embodiments which fall within the true spirit of this invention.

What is claimed is:

1. An automotive vehicle, interior trim fastener comprising:
    a base section being laterally enlarged, wherein at least a segment of the base section is metallic;
    a body section centrally attached to and projecting from the base section, the body section including a central hollow chamber openly accessible through the base, the body section being polymeric;
    at least three flexible tabs outwardly and laterally projecting from the body in a substantially equidistant manner; and
    externally tapered ribs projecting from a lead-in portion of the body section.

2. The fastener of claim 1 wherein the tabs are polymeric.

3. The fastener of claim 1 wherein there are at least three threaded fastener-receiving holes in the base.

4. The fastener of claim 1 further comprising at least six externally tapered ribs projecting from a lead-in end of the body section opposite the base section.

5. The fastener of claim 1 wherein a peripheral edge of the base section is circular, and the base section is permanently attached to the body section and the tabs.

6. The fastener of claim 1 in combination with at least an automotive vehicle sunvisor, an appearance bezel and a headliner trim panel; the bezel and at least one of the sections sandwiching the headliner trim panel therebetween; and the bezel coupling the sunvisor to at least one of the sections.

7. An automotive vehicle apparatus comprising:
    a sunvisor assembly including an elbow, a sunvisor blade rotatably coupled to the elbow, and a bezel substantially surrounding a portion of the elbow and being visible from inside the vehicle;
    a fastener comprising resilient vehicular body-engaging tabs and a laterally enlarged base secured to the tabs, one of the tabs and base including a polymeric material, and the other of the tabs and base including a metallic material; and
    a headliner sandwiched between the bezel and the base with a segment of the elbow extending through the headliner;
    the sunvisor assembly being removably secured to the fastener.

8. The apparatus of claim 7 wherein the polymeric material is integrally molded to the metallic material of the fastener as a single and permanently attached piece.

9. The apparatus of claim 7 wherein the base includes a metallic section and the tabs are polymeric.

10. The apparatus of claim 7 wherein the base is polymeric and the tabs are metallic.

11. The apparatus of claim 7 wherein the tabs are removably secured to the base in a snap-fit manner free of adhesive and free of threaded fasteners.

12. A fastener comprising:
    a polymeric member including a laterally enlarged surface with at least one integrally formed rib upstanding therefrom;
    at least two metallic members being removably coupled to the polymeric member by a snap-fit coupling, the metallic members including at least two snap-in panel-engaging tabs which are flexibly movable relative to the polymeric member;
    the snap-fit coupling comprising a flexible member coupled to one of: (a) the polymeric member and (b) the metallic members, the other of the polymeric member and the metallic members including an aperture, the flexible member being movable into the aperture to at least partially couple the polymeric member and the metallic members;
    all of the members being hidden from view when installed; and
    a central metallic section integrally connecting the metallic members and the metallic members being spaced away from each other.

13. The fastener of claim 12 wherein the polymeric member further comprises a channel defined at least in part by upstanding walls with inwardly facing ledges, wherein the flexible member is connected to the polymeric member and is located adjacent the channel, wherein at least one of the metallic members includes the aperture and is slidably engageable into the channel in a lateral direction such that the flexible member moves into the aperture so as to be secured therein at least in part by the snap-fit coupling.

14. The fastener of claim 12 wherein the metallic members are secured to the polymeric member in a removable and quick-connect manner free of a separate connector between the metallic and polymeric members.

15. A fastener comprising:
    a polymeric member including a laterally enlarged surface with at least one integrally formed rib upstanding therefrom; and
    a metallic member being removably coupled to the polymeric member by a snap-fit coupling, the metallic member including at least two snap-in panel-engaging tabs which are flexibly movable relative to the polymeric member;
    the snap-fit coupling comprising a flexible member coupled to one of the polymeric member and the metallic member, the other of the polymeric member and the metallic member including an aperture, the flexible member being movable into the aperture to at least partially couple the polymeric member and the metallic member;
    all of the members being hidden from view when installed;
    wherein the polymeric member further comprises a channel defined at least in part by upstanding walls with inwardly facing ledges, wherein the flexible member is connected to the polymeric member and is located adiacent the channel;

wherein the metallic member includes the aperture and is slidably engageable into the channel in a lateral direction such that the flexible member moves into the aperture so as to be secured therein at least in part by the snap-fit coupling;

wherein each of the tabs of the metallic member is substantially flat and further comprises an offset wing, each of the tabs being substantially U-shaped, and each pair of the tabs being inwardly angled toward each other opposite the polymeric member; and a threaded fastener being removably inserted through a hole in the metallic member and extending between the tabs of the metallic member.

16. The fastener of claim 15 wherein the polymeric member further comprises a substantially flat interior trim-facing surface including a central aperture and a substantially oval-shaped periphery, the metallic member projecting from a second surface of the polymeric member opposite from the interior trim-facing surface.

17. The fastener of claim 15 wherein the polymeric member further comprises a wire-receiving channel leading from a periphery of the polymeric member to an aperture through the polymeric member.

18. The fastener of claim 15 in combination with at least an automotive vehicle sunvisor, an appearance bezel and a headliner trim panel; the bezel and polymeric member sandwiching the headliner trim panel therebetween; and the bezel coupling the sunvisor to the base.

19. An automotive vehicle interior trim assembly comprising:

(a) a fastener comprising:

a laterally enlarged base including an elongated channel; and a vehicular body-engaging retainer laterally and linearly sliding in the channel to a position where the retainer is secured to the base by a snap-fit coupling, the retainer comprising a snap-in engagement tab, the snap-fit coupling comprising a flexible member coupled to at least one of the base and the retainer, the other of the base and the retainer including an aperture, the flexible member moveable into the aperture during sliding of the retainer in the channel to secure the retainer to the base;

(b) an appearance bezel attached to the base; and (c) an interior trim panel sandwiched between the bezel and the base.

20. The fastener assembly of claim 19 wherein the retainer further comprises a second substantially flat engagement tab with offset wing members, each of the engagement tabs being substantially U-shaped, and the engagement tabs being inwardly angled toward each other opposite the base.

21. The fastener assembly of claim 20 further comprising an elongated member being removably inserted through a hole in a flange of the retainer and extending between the engagement tabs of the retainer.

22. The fastener assembly of claim 19 wherein the retainer is metallic and the base is polymeric.

23. The fastener assembly of claim 19 wherein the base further comprises a substantially flat interior trim-facing surface including a central aperture and a substantially oval-shaped periphery, the retainer projecting from a second surface of the base opposite from the interior trim-facing surface.

24. The fastener assembly of claim 19 wherein the base further comprises an elongated second channel extending from a periphery of the base to an aperture through the base.

25. The fastener assembly of claim 19 wherein the channel of the base is defined at least in part by upstanding walls with inwardly facing ledges, wherein the base includes the flexible member and the flexible member includes a snap-fit projection located adjacent the channel; and wherein a flange of the retainer includes the aperture and slidably engages into the channel in a lateral direction such that the snap-fit projection moves into the aperture such that the retainer is secured therein at least in part by the snap-fit projection.

26. The fastener assembly of claim 19 further comprising a second metallic snap-in retainer secured to the base and being spaced away from the first snap-in retainer.

27. The fastener assembly of claim 19 further comprising an automotive vehicle sunvisor, the interior trim panel being and a headliner trim panel, the bezel coupling the sunvisor to the base, and the retainer, base, headliner, bezel and sunvisor all being preassembled together as a modularized unit prior to vehicular installation.

* * * * *